United States Patent
Zook et al.

(10) Patent No.: US 6,525,168 B2
(45) Date of Patent: Feb. 25, 2003

(54) CHEMICALLY RESISTANT POLYTHIOTHERS AND FORMATION THEREOF

(75) Inventors: Jonathan D. Zook, Santa Clarita, CA (US); David W. Jordan, Northridge, CA (US); Dean M. Willard, New York, NY (US); George Jones, Tustin, CA (US); Michael Cosman, Irvine, CA (US)

(73) Assignee: PBT Brands, Inc., Santa Clarita, CA (US)

( * ) Notice: Subject to any disclaimer, the term of this patent is extended or adjusted under 35 U.S.C. 154(b) by 0 days.

(21) Appl. No.: 09/802,427

(22) Filed: Mar. 9, 2001

(65) Prior Publication Data

US 2002/0013450 A1 Jan. 31, 2002

(Under 37 CFR 1.47)

Related U.S. Application Data

(60) Provisional application No. 60/188,106, filed on Mar. 9, 2000.

(51) Int. Cl.$^7$ .............................................. C08G 75/02
(52) U.S. Cl. ...................... 528/373; 528/374; 528/397; 525/330.9; 525/535
(58) Field of Search .................. 528/373, 374; 528/397; 525/330.9, 535

(56) References Cited

U.S. PATENT DOCUMENTS

| 3,331,818 A | 7/1967 | Bertozzi ..................... 260/79.1 |
| 3,740,375 A | 6/1973 | Novak ......................... 260/61 |
| 3,763,124 A | 10/1973 | Edmonds, Jr. ............. 260/79.1 |
| 3,862,922 A | 1/1975 | Signouret et al. .............. 260/79 |
| 4,255,561 A | 3/1981 | Wood et al. ................. 528/388 |
| 4,263,078 A | 4/1981 | Millen et al. .......... 156/244.11 |
| 4,366,307 A | 12/1982 | Singh et al. ................. 528/373 |
| 4,609,762 A | 9/1986 | Morris et al. .................. 568/38 |
| 5,225,472 A | 7/1993 | Cameron et al. ........... 524/368 |
| 5,231,150 A | 7/1993 | McGrail et al. ............. 525/503 |
| 5,574,127 A | 11/1996 | Sau ............................. 528/125 |
| 5,912,319 A | 6/1999 | Zook et al. .................. 528/373 |
| 5,959,071 A | 9/1999 | DeMoss et al. ............. 528/378 |
| 6,172,179 B1 | 1/2001 | Zook et al. .................. 528/373 |
| 6,232,401 B1 | 5/2001 | Zook et al. .................. 525/191 |

OTHER PUBLICATIONS

Tarasiuk et al.; "Products of polycondensation of 4,4'-biphenyldithiol with some hydrocarbon dihalides"; 1997, Chem Abstract 128: 61872.*
Japanese Patent Abstract: JP363273646A, Nov. 10, 1988.
Japanese Patent Abstract: JP02000128857A, May 9, 2000.

* cited by examiner

*Primary Examiner*—Duc Truong
(74) *Attorney, Agent, or Firm*—Gifford, Krass, Groh, Sprinkle, Anderson & Citkowski, P.C.

(57) ABSTRACT

A polythioether comprising:

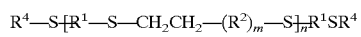

wherein $R^1$ is a $C_{1-10}$ alkyl, $-(R^3Q)_p R^3-$ or $C_6-C_{20}$ aryl where Q is O or S, each $R^3$ is independently $C_{1-6}$ alkyl, and p is an integer between 0 and 6; $R^2$ is $C_{1-6}$ alkyloxy or $C_{5-12}$ cycloalkyloxy, $R^4$ is H, $C_{1-6}$ alkyl, $C_{1-6}$ alkyl alcohol and $C_{0-6}$ alkyl substituted with $-[CH^2CH_2(R^2)_m-]X$, where X is a halogen, m is an integer between 1 and 4, and n is an integer selected to yield a molecular weight for said polythioether of between 1000 and 10,000 Daltons.

13 Claims, No Drawings

CHEMICALLY RESISTANT POLYTHIOTHERS AND FORMATION THEREOF

RELATED APPLICATION

This application claims priority of U.S. Provisional Patent Application 60/188,106 filed Mar. 9, 2000, and is incorporated herein by reference.

FIELD OF THE INVENTION

The present invention relates to polythioethers and, more particularly, to polythioethers having a specified ratio of constituent atoms therein and a process for the formation thereof.

BACKGROUND OF THE INVENTION

Thiol-terminated sulfur-containing polymers have a long history of use in aerospace sealants because of their fuel resistant nature upon cross-linking. Among the commercially available polymeric compounds having sufficient sulfur content to exhibit this desirable property are the polysulfide polymers described, e.g., in U.S. Pat. No. 2,466,963 and sold under the trade name LP® polysulfide by Morton International of Chicago, Ill. and the alkyl side chain containing polythioether polymers described, e.g., in U.S. Pat. No. 4,366,307 that are sold in complete sealant formulations by PRC-DeSoto International, Inc. of Glendale, Calif. In addition to fuel resistance, polymers useful in this context must also have the desirable properties of low temperature flexibility, liquidity at room temperature, high temperature resistance, a reasonable cost of manufacture, and not be so malodorous as to prevent commercial acceptance of compositions that contain the subject polymers.

U.S. Pat. No. 4,366,307 teaches the use of hydroxyl-functional thioethers having pendent alkylene groups to obtain polymers having good flexibility and liquidity. However, the disclosed condensation reaction has a maximum yield of about 75% of the desired condensation product. Furthermore, the acid-catalyzed reaction of beta-hydroxysulfide monomers, such as thiodiglycol, yields significant quantities (typically not less than about 25%) of an aqueous solution of thermally stable and highly malodorous cyclic byproducts, such as 1-thia-4-oxa-cyclohexane. As a result, the commercial viability of the disclosed polymers is limited. Further, pendent alkylene chains increase the carbon content of the polymer necessitating a high sulfur content to achieve sufficient chemical resistance properties.

U.S. Pat. No. 5,959,071 teaches the use of pendant alkylene chains and high sulfur content to achieve the chemical resistance and room temperature liquidity required for aerospace sealant formulations.

Certain prior art work has developed hydroxyl-terminated polythioethers by condensing thiodiglycol in the presence of certain etherifying catalysts as, for example, shown in U.S. Pat. Nos. 3,312,743 and 3,335,189. Compounds produced by these patents give semi-crystalline waxy solids, gums or low molecular weight liquids that have limited commercial utility.

Another desirable feature in polymers suitable for use in aerospace sealants is high temperature resistance. Inclusion of covalently-bonded sulfur atoms in organic polymers has been shown to enhance high temperature performance. However, in the polysulfide polymers disclosed in U.S. Pat. No. 2,466,963, the multiple —S—S— linkages in the polymer backbones result in compromised thermal resistance. In the polymers disclosed in U.S. Pat. No. 4,366,307, enhanced thermal stability is achieved through replacement of polysulfide linkages with polythioether (—S—) linkages. In practice, however, the disclosed materials have compromised thermal resistance due to traces of the residual acid condensation catalyst.

U.S. Pat. No. 5,912,319 teaches the use of combinations of certain polythiols with oxygenated dienes resulting in polythioether polymers that are liquids at room temperature and pressure and have desirable physical properties. Further, these combinations are substantially free of residual catalysts and malodorous cyclic byproducts. Unfortunately, the oxygenated dienes described are very difficult to prepare and only a limited number of commercial compounds are known to exist.

In addition to the foregoing deficiencies with the previously known polythioethers, the prior art polythioethers are typically also crystallizing products which, even if liquid or semi-liquid at ambient temperatures, when cooled sufficiently to solidify will not return to their previous liquid state even when the temperature is raised to ambient.

SUMMARY OF THE INVENTION

A polythioether comprising:

wherein $R^1$ is a $C_{1-10}$ alkyl, $—(R^3Q)_pR^3—$ or $C_6–C_{20}$ aryl where Q is O or S, each $R^3$ is independently $C_{1-6}$ alkyl, and p is an integer between 0 and 6; $R^2$ is $C_{1-6}$ alkyloxy or $C_{5-12}$ cycloalkyloxy, $R^4$ is H, $C_{1-6}$ alkyl, $C_{1-6}$ alkyl alcohol and $C_{0-6}$ alkyl substituted with $-[CH_2CH_2(R^2)_m-]X$, where X is a halogen, m is an integer between 1 and 4, and n is an integer selected to yield a molecular weight for said polythioether of between 1000 and 10,000 Daltons. A polyfunctionalizing agent is optionally provided in order to increase the functionality of a polythioether from 2 to 4 with the most preferred range being 2.05 to 3.00.

A process for forming such a polythioether includes the step of reacting a polythiol with a polyhalide in the presence of an aqueous base. The use of a polythioether is contemplated as an aerospace sealant.

DETAILED DESCRIPTION OF THE INVENTION

This invention consists of a polythioether polymer made by the reaction of a thiol (dithiol) with a polyhalide in an aqueous base. The reaction may be illustrated as follows:

(I)

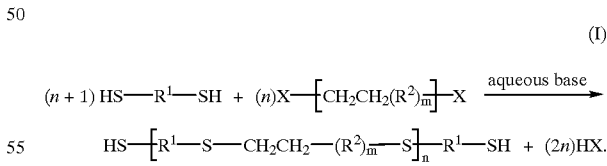

In the above illustration, "n" is a number such that a molecular weight of about 1000–10,000 Daltons is obtained resulting in material having a viscosity of less than 1000 poise. $R^1$ is a $C_{1-10}$ alkyl, $—(R^3Q)_pR^3—$ or $C_6–C_{20}$ aryl where Q is O or S, each $R^3$ is independently $C_{1-6}$ alkyl, and p is an integer between 0 and 6. Substituents on $R^1$ are those which do not interfere with the curing reaction of the polythiol with either a polyepoxide or polydiene. Thus, $R^2$ is free of reactive unsaturated carbon to carbon bonds, as well as highly water sensitive species. Preferably, $R^1$ is a linear alkyl. Preferred heteroatoms are S and O. $R^2$ is a $C_1$-$C_6$ alkyloxy or $C_5$-$C_{12}$ cycloalkyloxy, most preferably —OCH$_2$CH$_2$— or —OCH$_2$OCH$_2$CH$_2$—. X is a halogen, F, Cl, Br or I and most preferably Cl.

Suitable thiols illustratively include ethanedithiol, vinylcyclohexyldithiol, dicyclopentadienedithiol, dipentene dimercaptan, and hexanedithiol. Preferred thiols contain heteroatoms. Examples of which illustratively include dimercaptodiethyl sulfide (DMDS) with $R^1$ of CH$_2$CH$_2$SCH$_2$CH$_2$, dimercaptodiethyl ether (DMDE) with $R^1$ of CH$_2$CH$_2$OCH$_2$CH$_2$ and dimercaptodioxaoctane (DMDO) with $R^1$ of CH$_2$CH$_2$OCH$_2$CH$_2$OCH$_2$CH$_2$.

A polyhalide is chosen in conjugation with a polythiol to impart chemical resistance to the resulting polythioether, especially in the presence of jet reference fuel 1 (JRF). Chemical resistance is manifest at a molecular level by maintaining the atomic percent ratio C:S:O in the range 35–49:20–60:0–20. Thus, it will be apparent to those skilled in the art that pendant aliphatic moieties on the reactant polythiols and polyhalides necessitates an increase in chain S content to maintain the inventive polythioether atomic ratio and as such are generally disfavored.

Suitable polyhalides illustratively include di- and tri-halides such as 1,2-dichloroethane and 1,2,3-trichloropropane. The blend of halide monomer in one mode of modifying polymer functionality. Oxygenated polyhalides are most preferred in order to maintain the carbon atomic percent of the resulting polythioether below 50 percent. Examples of preferably polyhalides include Cl—CH$_2$CH$_2$OCH$_2$CH$_2$OCH$_2$CH$_2$—Cl and Cl—CH$_2$CH$_2$OCH$_2$OCH$_2$CH$_2$—Cl.

The aqueous base used to prepare polymers of this invention includes solutions of both inorganic and organic bases. Suitable inorganic bases include, but are not limited to, sodium and potassium hydroxide. Organic bases include any of a number of water soluble or dispersible tertiary amines such as pyridine.

In the representative reaction scheme illustrated above, the subscript n is chosen such that the resulting polymer has a molecular weight, Tg, and room temperature viscosity within the requisite range, for example, of an aerospace sealant. Preferred molecular weight includes 1000–6000 Daltons. In one embodiment, Tg should be as low as possible but below −40° C. Finally, room temperature viscosity should be below 1000 poise.

While in the first preferred embodiment of the present invention as summarized by Formula I, an excess of dithiol is present to assure thiol termination of the resulting polythioether polymer, it is appreciated that by varying the relative amounts of polythiol relative to polyhalide, that polymers can be prepared that have not only terminal thiol groups, but a generic terminus $R^4$ terminal where $R^4$ is H, $C_{1-6}$ alkyl, $C_{1-6}$ alkyl alcohol, and $C_{0-6}$ alkyl substituted with $\text{-}[CH_2CH_2(R^2)]_m\text{-}X$. Furthermore, the polythioether polymers thus formed need not be further reacted prior to cure or, alternatively, are further reacted with other compounds to form capped polythioether polymers. Capping of polythioethers of the present invention affords the opportunity to include additional terminal functionalities into the inventive polymers. Such capping moieties illustratively include hydroxyl, olefin, epoxy, cyano, isocyano, silyl, siloxy, secondary amine and alkyl groups.

In another embodiment, the inventive polythioether is greater than difunctional and is represented by the formula: B—(I—$R^4$)$_z$ where B is a z-valent residue of a polyfunctionalizing agent, z is an integer value from 3 to 6, I is the resulting polythioether of Formula I less the terminal hydrogen groups, and $R^4$ is H, $C_{1-6}$ alkyl, $C_{1-6}$ alkyl alcohol, and $C_{0-6}$ alkyl substituted with $\text{-}[CH_2CH_2(R^2)]_m\text{-}X$. Preferably, the average functionality, as defined as the number of reactive groups per polythioether molecule, is above 2 and, more preferably, ranges between about 2.05 and about 3.00.

In aerospace sealant applications, the polythioether polymer derived according to the invention may be combined with suitable lightweight fillers. Typically, a polythioether polymer is present at from about 40 to about 80 weight percent, 0.3 to 1.5 weight percent lightweight fillers or 10 to 50 weight percent of conventional inorganic fillers, 0.1 to 2 weight percent curing agent, and the remainder of the composition optionally including one or more additives of: pigments, cure accelerators, surfactants, adhesion promoters, thixotropic agents and solvents. Suitable lightweight fillers for use in this invention may be organic, inorganic, or a composite of both. They fall within two categories—microspheres and amorphous fillers. The amounts of the microspheres and amorphous lightweight fillers used in the composition of the invention may be from about 0.3 to about 10 percent and from about 4 to 15 percent of the total weight of the composition, respectively. The specific gravity (s.g.) of the microspheres ranges from about 0.1 to 0.7 and are exemplified by polystyrene foam, microspheres of polyacrylates and polyolefins, and silica microspheres having particle sizes ranging from 5 to 100 microns and a specific gravity of 0.25 (ECCOSPHERES®, W. R. Grace & Co.). Other examples include alumina/silica microspheres having particle sizes in the range of 5 to 300 microns and a specific gravity of 0.7 (FILLITE®, Pluess-Stauffer International), aluminum silicate microspheres having a specific gravity of from about 0.45 to about 0.7 (Z-LIGHT®), and calcium carbonate-coated polyvinylidene copolymer microspheres having a specific gravity of 0.13 (DUALITE 6001AE®, Pierce & Stevens Corp.).

Suitable amorphous lightweight fillers for use in this invention have a specific gravity ranging from about 1.0 to about 2.2 and are exemplified by calcium silicates, fumed silica, precipitated silica, and polyethylene. Examples include calcium silicate having a specific gravity of from 2.1 to 2.2 and a particle size of from 3 to 4 microns (HUBERSORB HS-600®, J. M. Huber Corp.) and fumed silica having a specific gravity of 1.7 to 1.8 with a particle size less than 1 (CAB-O-SIL TS-720®, Cabot Corp.). Other examples include precipitated silica having a specific gravity of from 2 to 2.1 (HI-SIL TS-7000®, PPG Industries), and polyethylene having a specific gravity of from 1 to 1.1 and a particle size of from 10 to 20 microns (SHAMROCK S-395®, Shamrock Technologies Inc.).

Table I illustrates the results of reacting various thiols and polyhalides in aqueous base:

TABLE I

| Thiol | Halide | % Yield* | Carbon % | Hydrogen % | Sulfur % | Oxygen % | Physical State | JRF Resistance |
|---|---|---|---|---|---|---|---|---|
| DMDS | Cl—CH$_2$CH$_2$—Cl | 97 | 40 | 7 | 53 | 0 | Semi-solid | Excellent |
| DMDS | Cl—CH$_2$CH$_2$OCH$_2$CH$_2$—Cl | 99 | 43 | 7 | 43 | 7 | Liquid | Excellent |
| DMDS | Cl—CH$_2$CH$_2$OCH$_2$CH$_2$OCH$_2$CH$_2$—Cl | 98 | 45 | 7 | 36 | 12 | Liquid | Good |

TABLE I-continued

| Thiol | Halide | % Yield* | Carbon % | Hydrogen % | Sulfur % | Oxygen % | Physical State | JRF Resistance |
|---|---|---|---|---|---|---|---|---|
| DMDO | Cl—CH$_2$CH$_2$—Cl | 99 | 46 | 8 | 31 | 15 | Liquid | Good |
| DMDO | Cl—CH$_2$CH$_2$OCH$_2$CH$_2$—Cl | 99 | 48 | 8 | 25 | 19 | Liquid | Acceptable |
| DMDO | Cl—CH$_2$CH$_2$OCH$_2$CH$_2$OCH$_2$CH$_2$—Cl | 98 | 49 | 8 | 21 | 22 | Liquid | Marginal |

*Expressed as percent of theoretical

As Table I shows, according to the reaction process of the invention, liquid polythioethers are produced without cyclized byproducts. In this manner, the tendency for production of highly malodorous cyclic byproducts is greatly reduced. Further, monomer blend ratios useful in the context of this invention are chosen such that the following composition is preserved: carbon content, less than 49 percent by weight; sulfur content, 21–45 percent by weight; and oxygen content, less than 20 percent by weight. In this manner, the chemical resistance properties of the resulting polymer are suitable for applications including, but not limited to, aerospace sealants.

All patents and publications cited herein are hereby incorporated by reference to the same extent as if each individual patent or publication was explicitly and individually incorporated by reference.

What is claimed is:

1. A polythioether comprising:

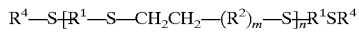

wherein $R^1$ is a $C_{1-10}$ alkyl, —$(R^3Q)_pR^3$— or $C_6$–$C_{20}$ aryl where Q is O or S, each $R^3$ is independently $C_{1-6}$ alkyl, and p is an integer between 0 and 6; $R^2$ is $C_{1-6}$ alkyloxy or $C_{5-12}$ cycloalkyloxy, $R^4$ is H, $C_{1-6}$ alkyl, $C_{1-6}$ alkyl alcohol and $C_{0-6}$ alkyl substituted with —[CH$_2$CH$_2$(R$^2$)$_m$]X, where X is a halogen, m is an integer between 1 and 4, and n is an integer selected to yield a molecular weight for said polythioether of between 1000 and 10,000 Daltons.

2. The polythioether of claim 1 wherein $R^1$ is $C_2$–$C_8$ alkyl.

3. The polythioether of claim 1 where $R^1$ is —$(R^3Q)_p$ $R^3$— where $R^3$ in each occurrence is $C_{1-2}$ and p being 1 or 2.

4. The polythioether of claim 1 wherein $R^2$ is $C_1$–$C_2$ alkyloxy.

5. The polythioether of claim 1 wherein the molecular weight of said polythioether is between 2000 and 6000 Daltons.

6. The polythioether of claim 1 wherein $R^4$ is hydrogen.

7. The polythioether of claim 1 wherein $R^4$ is —[CH$_2$CH$_2$ (R$^2$)$_m$]X.

8. The polythioether of claim 1 having an atomic percentage ratio C:S:O of 35–49:20–60:0–20.

9. The polythioether of claim 1 wherein $R^4$ is capped with an additional terminal functionality selected from the group consisting of: hydroxyl, olefin, epoxy, cyano, isocyano, silyl, siloxy, secondary amine and alkyl groups.

10. A mixture of polythioether polymers comprising: a polythioether polymer having the formula

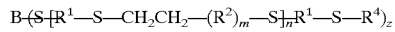

where B is a z-valent group of a polyfunctionalizing agent, Z is an integer from 3 to 6, $R^1$ is a $C_{1-10}$ alkyl, —$(R^3Q)_pR^3$— or $C_6$–$C_{20}$ aryl where Q is O or S, each $R^3$ is independently $C_{1-6}$ alkyl, and p is an integer between 0 and 6; $R^2$ is $C_{1-6}$ alkyloxy or $C_{5-12}$ cycloalkyloxy, $R^4$ is H, $C_{1-6}$ alkyl, $C_{1-6}$ alkyl alcohol and $C_{0-6}$ alkyl substituted with —[CH$_2$CH$_2$ (R$^2$)$_m$]X, where X is a halogen, m is an integer between 1 and 4, and n is an integer selected to yield a molecular weight for said polythioether of between 1000 and 10,000 Daltons.

11. The polythioether mixture of claim 10 wherein z is 3.

12. The polythioether mixture of claim 10 wherein the mixture has an average functionality between 2 and 4.

13. The polythioether mixture of claim 12 wherein the average functionality is between 2.05 and 3.00.

* * * * *

Adverse Decision in Interference

Patent No. 6,525,168, Jonathan D Zook, David W. Jordan, Dean M. Willard, George Jones, Michael Cosman, CHEMICALLY RESISTANT POLYTHIOTHERS AND FORMATION THEREOF, Interference No. 105,555, final judgment adverse to the patentees rendered June 30, 2008 as to claims 1-13.

*(Official Gazette February 17, 2009)*